United States Patent [19]

Morters et al.

[11] 4,093,898

[45] June 6, 1978

[54] CONTROL SYSTEM FOR REGULATING THE SPEED OF AN ELECTRIC MOTOR

[75] Inventors: Ronald W. Morters; Lawrence A. Millonzi, both of Milwaukee, Wis.

[73] Assignee: Harnischfeger Corporation, W. Milwaukee, Wis.

[21] Appl. No.: 698,320

[22] Filed: Jun. 22, 1976

[51] Int. Cl.$^2$ ............................................. H02P 1/26
[52] U.S. Cl. .................................. 318/227; 318/237; 318/231
[58] Field of Search .......... 318/227, 230, 231, 203 R, 318/207 R, 237

[56] References Cited

U.S. PATENT DOCUMENTS

| | | | |
|---|---|---|---|
| 3,586,935 | 6/1971 | Lundelius, Sr. | 318/237 |
| 3,593,083 | 7/1971 | Blaschke | 318/227 |
| 3,753,064 | 8/1973 | Agarwal et al. | 318/227 |
| 3,769,564 | 10/1973 | Rettig | 318/227 |

*Primary Examiner*—Herman J. Hohauser
*Attorney, Agent, or Firm*—James E. Nilles

[57] ABSTRACT

A control system for regulating the torque and speed of an alternating current induction motor used in the traverse drive of an overhead travelling crane comprises an SCR bank controlled by a firing circuit responsive to actuation of an operator-controlled induction master control. The control system further comprises means for deriving a torque signal indicative of instantaneous rotor torque, means for deriving a speed signal indicative of instantaneous rotor speed, and summing means for combining the torque signal, the speed signal, and a reference signal from the induction master control to provide an error signal which is used to operate the firing circuit to thereby control the power delivered by the SCR bank to the motor and ensure that motor torque is constant for the control position selected or speed is controlled up to the torque level selected. The means for deriving the speed signal measure the magnitude of the instantaneous rotor voltage by sampling during a fixed period voltage derived from the supply voltage. The voltage being sampled is the voltage at the slip resistors connected to the motor rotor. Means are provided to combine the speed signal with the torque signal only after motor speed exceeds a desired level.

12 Claims, 2 Drawing Figures

CONTROL SYSTEM FOR REGULATING THE SPEED OF AN ELECTRIC MOTOR

BACKGROUND OF THE INVENTION

Field of Use

This invention relates generally to a control system for regulating the torque and speed of a wound rotor electric motor such as is used, for example, in the traverse drive of an overhead travelling crane.

Description of the Prior Art

In the operation of overhead travelling cranes used in industry, it is desirable to be able to regulate the torque and speed of the traverse drive motor to provide for smooth acceleration, speed regulation, and good inching performance so as to reduce or prevent swinging or jerking of a load suspended from the crane hook as the traverse drive motor is started, stopped, accelerated, decelerated, and during transitions between forward and reverse movement. Heretofore, in some cranes where the traverse wheels were driven by an alternating current wound rotor motor, primary or secondary reactors were employed to regulate power in the motor. Banks of SCRs have also been used to regulate primary power. Direct current choppers have been used to effectively change secondary resistance and thus effect motor control. As implemented, most of these control schemes obtain torque and speed control through similar methods. Torque control has in general really been a current control. For example, in a secondary reactor system, when the motor is plugged, torque was controlled solely by regulating current to the motor. However, current flow in the secondary winding of the motor is not only a function of motor torque but also of the total power supplied to the motor. Control of current without any reference to the power factor leads to a rather nonlinear torque/speed characteristic. In the past it has been up to the operator to compensate for these nonlinearities by manipulation of the operator's control handle to prevent too rapid acceleration or deceleration of the traverse drive, with resultant swinging of the suspended load. However, speed control has been obtained through the use of a DC tachometer, but, while this provides excellent control, it detracts from the simplicity and ruggedness normally desired in an alternating current induction drive. Where torque and speed have been used in conjunction with one another, it has been a simple summing circuit which in general was accompanied by poor regulation.

SUMMARY OF THE INVENTION

The traverse drive of an overhead travelling crane employs an alternating current wound rotor motor, and a control system is provided for regulating the torque and speed of the motor. The control system comprises a bank of SCRs controlled by firing pulse generators which regulate the electric power applied to the motor in response to an actuation of an operator controlled induction master control. The control system further comprises means for deriving a voltage signal indicative of the instantaneous voltage in the motor stator winding; means for deriving a current signal indicative of the instantaneous current in the motor stator winding; and means for multiplying the voltage and current signals to provide a wattage or torque signal which is proportional to the instantaneous torque being developed in the motor. The control system further comprises means for deriving a speed signal which is indicative of instantaneous motor speed; means for combining the aforesaid torque signal and speed signal (after motor speed exceeds a predetermined speed) to provide a feedback signal; and means, including a summing circuit, wherein the feedback signal is compared to a reference signal from the induction master control to provide an error signal which is applied to the firing pulse generators to thereby regulate the bank of SCRs to effect torque and speed control of the motor. The means for deriving the speed signal indicative of instantaneous motor speed measures the magnitude of the instantaneous rotor voltage. During a fixed period of time, the sampling time period has a fixed time relation to the impressed stator voltage. The means for deriving the sampling period comprises a transformer and "solid state" timing circuit. The instantaneous rotor voltage is integrated by a "solid state" circuit and thereby gives an indication of rotor speed to a first approximation.

In a control system in accordance with the invention the torque signal is derived from two sources, namely, from a voltage signal indicative of the line-to-neutral voltage in the motor stator, and a current signal proportional to the current in one or more of the phase lines to the motor. The aforesaid signals representative of voltage and current are directed to a multiplier circuit which converts them to the torque signal, which takes the form of a voltage signal proportional to the torque being developed by the motor. The torque signal is based on the concept that power in watts supplied to the motor is equal to the sum of the watts delivered as horsepower or torque at the motor shaft plus watts consumed by the motor rotor resistance plus total fixed motor losses measured in watts. The proportional wattage between shaft horsepower and rotor resistance losses have a fixed relationship, taking into account fixed motor losses, and a control signal based thereon can be employed to control the SCRs to regulate torque delivered by the motor.

A control system in accordance with the present invention provides true torque control thereby eliminating nonlinearities, and effects regulation of both torque and speed of the motor to provide smoother acceleration (due to smoother torque control), more tightly regulated speed, better inching speed, and prevention of jerking and swinging of the crane load. In a control system in accordance with the invention both torque and speed are automatically regulated, and both torque and speed are porportional to the throw of a single operator's handle. A system in accordance with the invention eliminates wheel spin and jerk in a traverse drive for a crane, greatly reduces bad swing and provides for easier crane control by the crane operator. Other objects and advantages of the invention will hereinafter appear.

DESCRIPTION OF A PREFERRED EMBODIMENT

Figure 1:
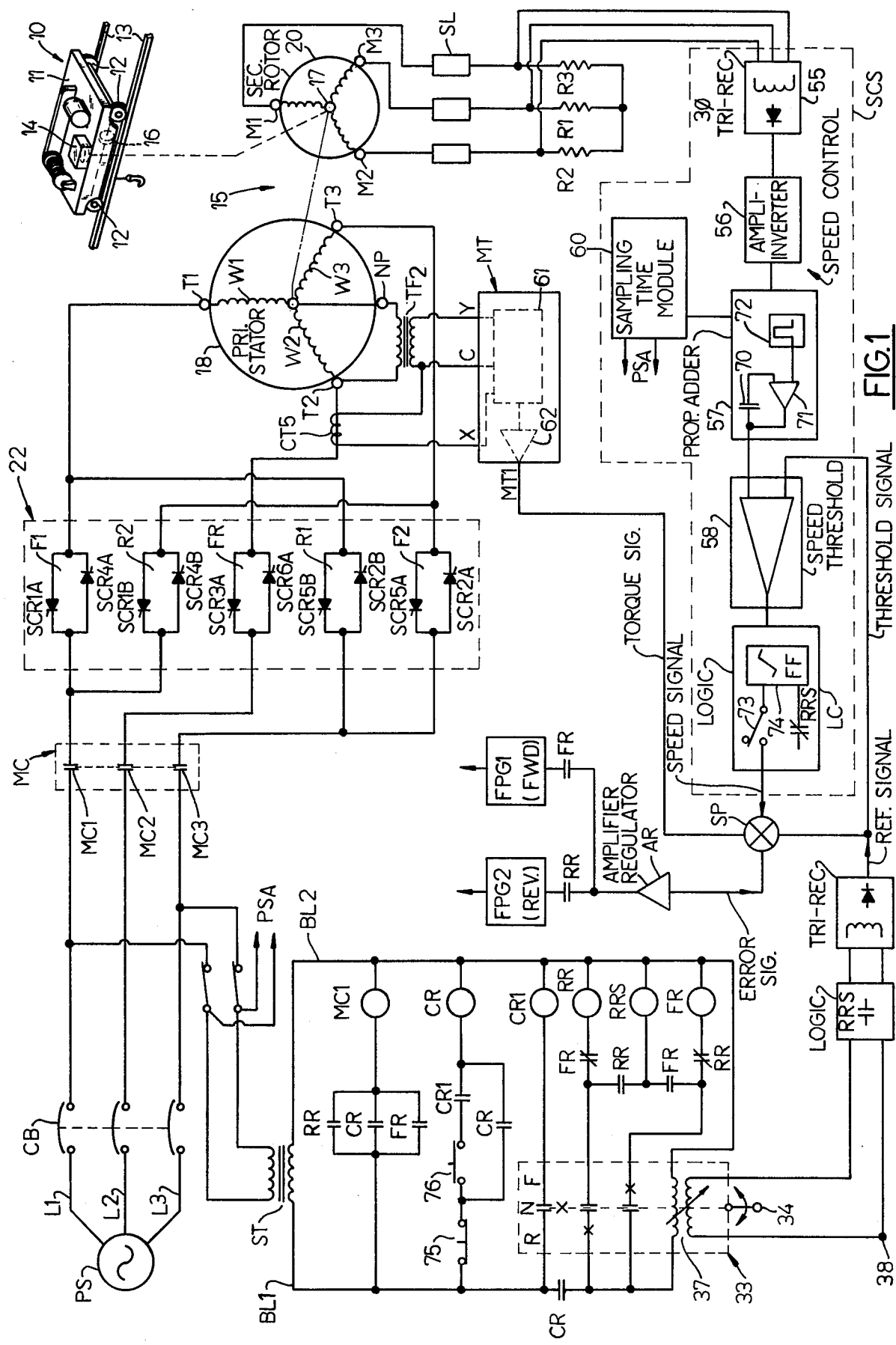
FIG. 1 is a schematic diagram of a motor control system in accordance with the present invention for the motor of the traverse drive of an overhead travelling crane.

Referring to FIG. 1 of the drawing, the numeral 10 designates an overhead travelling crane which comprises a carriage 11 having four traverse wheels 12 by means of which the crane is supported and driven on a pair of overhead rails 13. Two of the wheels, for example, are driven in a conventional manner through a traverse drive mechanism 14 by an alternating current wound rotor motor 15 which is mounted on the carriage 11 of crane 10. A spring applied electrically releasable brake 16 is provided for the shaft 17 of motor 15 and the wheels 12 which it drives.

FIG. 1 shows a control system in accordance with the invention which is provided for regulating the torque and speed of the motor 15. Generally considered, the control system comprises a bank 22 of SCRs controlled by firing pulse generators FPG 1 and FPG 2 which regulate the electric power applied to the motor 15 from an alternating current power source PS in response to an actuation of an operator controlled induction master control 33. The control system further comprises means, including a transformer TF2, for deriving a voltage signal indicative of the instantaneous voltage in the motor stator (primary) winding 18; means, including transformer CT5, for deriving a current signal indicative of the instantaneous current in the motor stator winding 18; and means, including a multiplier MT, for multiplying the voltage and current signals to provide a wattage or torque signal which is proportional to the instantaneous torque being developed in the motor 15. The control system further comprises means, hereinafter described, for deriving a speed signal which is indicative of instantaneous motor speed; means, including a logic circuit LC, to allow the combination of the aforesaid torque signal and speed signal (after motor speed exceeds a predetermined speed so that during "plugging" only the torque control prevails) to provide a feedback signal; and means, including a summing circuit SP, wherein the feedback signal is compared to a reference signal from the induction master control 33 to provide an error signal which is applied to the amplifier regulator AR thence to the firing pulse generators FPG1 and FPG2 to thereby regulate the bank 22 of SCRs to effect torque and speed control of the motor 15. The aforementioned means for deriving the speed signal indicative of instantaneous motor speed measures the magnitude of the instantaneous rotor voltage during a fixed period being of fixed time relationship to the stator supply voltage, the sensed rotor voltage being derived from the slip rings SL and slip resistors R1, R2, and R3 connected to the motor rotor 20.

As FIG. 1 shows, the motor 15 comprises a stator (or primary winding) 18 having terminals T1, T2, and T3, and a rotor (or secondary winding) 20 having terminals M1, M2, and M3. Motor stator 18 has three star-connected stator windings W1, W2, and W3 which are all joined together at a neutral point designated NP. The motor 15 and control system are energizable from, for example, a 460 volt three phase 60Hz alternating current power source PS connected to the phase lines L1, L2, and L3. The phase lines L1, L2, and L3 are connectable to the SCR stack 22 through the contacts of a conventional motor contactor MC having contacts MC1, MC2, and MC3 and thence to motor stator terminals T1, T2, and T3. The phase lines L1, L2, and L3 are also connectable to the motor control system as hereinafter explained. The motor rotor 20 has a bank of 30% slip resistors R1, R2, and R3 connected in circuit with the rotor terminals M1, M2, and M3 in a conventional manner.

As FIG. 1 shows, the SCR bank 22 comprises five pairs of SCRs (silicon controlled rectifiers), designated F1, F2, R1, R2, and FR which are arranged in circuit in the phase lines L1, L2, and L3, between contactor MC and the motor stator terminals T1, T2, and T3. Each of the five pairs of SCRs comprises a pair of SCRs connected in parallel with each other in oppositely poled relationship. Pair R1 comprising SCR5B and SCR2B is connected between phase line L3 and motor stator terminal T1. Pair F1 comprising SCR1A and SCR4A is connected between phase line L1 and motor stator terminal T1. Pair T1. Pair FR comprising SCR3A and SCR6A is connected between phase line L2 and motor stator terminal T2. Pair F2 comprising SCR5A and SCR2A is connected between phase line L3 and motor stator terminal T3. Pair R2 comprising SCR1B and SCR4B is connected between phase line L1 and motor stator terminal T3. The SCR pairs F1, F2, and FR are operative to connect the motor for operation in a forward direction, and the SCR pairs R1, R2, and FR are operative to connect the motor for operation in the reverse direction.

As FIG. 1 shows, the SCR bank 22 controls or regulates the energization of motor 15, the direction of rotation of the motor, and the speed and torque of the motor in response to control signals received from firing pulse generators FPG1 and FPG2. Firing pulse generator FPG1 and controls forward operations of motor 15, and firing pulse generator FPG2 controls reverse operations of the motor. The circuitry and mode of operation of an SCR bank such as 22 and firing pulse generators such as FPG1 and FPG2 are described in detail in U.S. Pat. Application Ser. No. 607,601, filed Aug. 25, 1975, by Price and Nash for "Direct Current Braking Means for Wound Rotor Motor" and assigned to the same assignee as the present application. The firing pulse generator FPG1 effects operation of the following SCRs: SCR4A, SCR1A, SCR6, SCR3, SCR2A, SCR5A. Firing pulse generator FPG2 operates SCR4B, SCR1B, SCR6, SCR3, SCR2B, SCR5B.

Referring to FIG. 1, there is shown a diagram of the circuit for controlling the energization of the motor 15 and the control system. This circuit comprises a stepdown transformer ST which has its primary winding connected across the phase lines L1 and L2 and which has its secondary winding connected to energize two bus lines BL1 and BL2. An industion master control 33 and the following five relay coils are connected across and energizable from the bus lines BL1 and BL2 when the various contacts in series therewith are closed; namely, relay coils CR, CR1, RR, RRS, FR, and contactor coil MC1.

Induction master control 33 has an operator's control handle 34 enabling it to be operated from an off position to a forward speed point F to close its forward contact F, or to a reverse speed point R to close its reversing contact R. Induction master control 33 also comprises a variable output transformer 37 which provides a variable output alternating current, voltage signal at its output terminal 38, which signal is proportional to handle throw, and is used for motor control purposes, being applied to summing circuit SP after rectification and integration (smoothing). The induction master control 33 is a conventionally known type of motor control device. It is to be noted that the relay coil FR controls the similarly designated contacts to effect operation of the appropriate firing pulse generators FPG1 and FPG2 for operation of the motor 15 in the forward or reverse direction in response to operation of the induction master control 33.

Referring to FIG. 1, the control system comprises means for deriving a voltage signal indicative of the instantaneous voltage in the motor 15. Such means comprise a transformer TF2 for measuring line-to-neutral voltage in motor stator 18 and for providing a voltage signal proportional thereto. One end of the primary winding of transformer TF2 is connected to the terminal T2 of the motor stator 18. The other end of the primary winding of transformer TF2 is connected to terminal NP of motor stator 18. Thus, transformer TF2 senses the line-to-neutral voltage in motor stator 18 and provides a voltage signal proportional thereto across the output terminals Y and C of the secondary winding of transformer TF2 which are connected to multiplier MT.

The control system further comprises means for deriving a current signal indicative of the instantaneous current in motor stator 18. Such means comprise a current transformer CT5 which is electrically coupled to the phase line L2 between the SCR bank 22 and terminal T2 of the motor stator 18. One end of the current transformer CT5 is connected to a common terminal on transformer TF2, and the other terminal of the current transformer CT5 is connected to a terminal X in the multiplier circuit MT. The current signal appearing as the output of the current transformer CT5 is proportional to the current in the phase line L2 to motor 15.

Figure 2:
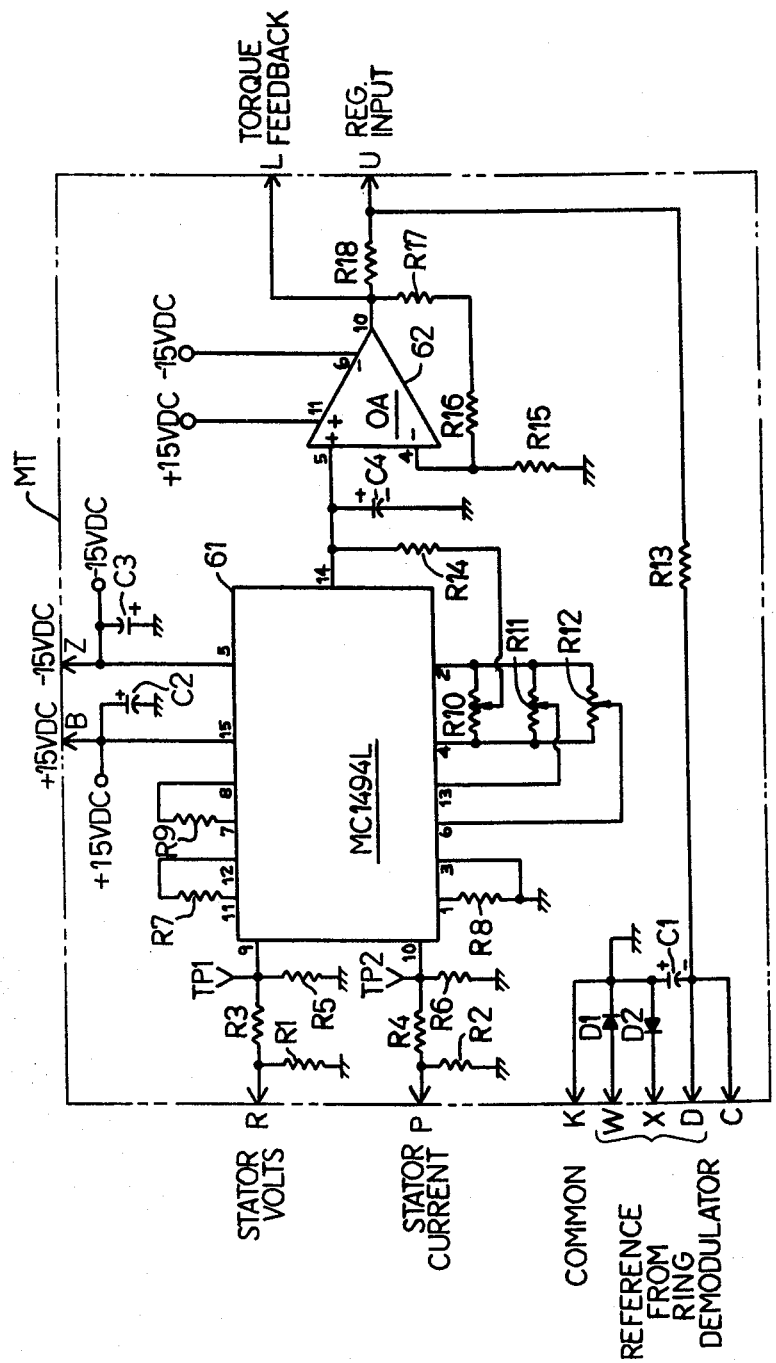
FIG. 2 is a circuit diagram of a portion of the schematic diagram shown in FIG. 1 and, in particular, depicts the torque control portion of the circuit.

Means are provided for multiplying the voltage signal appearing across the output terminals Y and C of transformer TF2 and the current signal appearing across the output terminals X and C of the current transformer CT5 to provide a wattage or torque signal in the form of a voltage at the output terminal MT1 of multiplier MT which is proportional to the instantaneous torque being developed by motor 15. Referring to FIG. 2 which is a circuit diagram of the multiplier circuit MT shown in FIG. 1, it is seen that the circuit generally comprises a linear four-quadrant multiplier integrated circuit device 61 (typically a Motorola type MC1494L) and an operational amplifier 62 (typically a type 741C Motorola). The input terminals 9 and 10 of multiplier 61 are connected to the terminals Y and X, respectively, as shown in FIG. 2. The output terminal 14 of multiplier 61 is connected to positive input terminal 5 of operational amplifier 62. The negative input terminal 4 of operational amplifier 62 is connected to ground through a resistor R15. The output terminal 10 of operational amplifier 62 is connected to provide an output voltage at its output terminal 10 which is proportional to the torque of motor 15.

The control system further comprises means for deriving a speed signal from motor 15 which is indicative of instantaneous motor speed and, in the embodiment shown, such means measures the magnitude of the instantaneous rotor voltage. Such means comprise the rotor slip rings SL which are connected to a three-phase transformer rectifier unit 55 and from thence to an amplitude inverter 56. The output of inverter 56 is fed to a time-controlled sampling module switch and integrator 60, the integrated output signal of which is then fed, as at $PS_A$, into a level (voltage) controlled switch SW1. The switch SW1 prevents the speed control circuit SCS from taking effect until the speed of motor 15 exceeds a predetermined value set by the position of the induction master control 33 and the motor load is normal (positive). The output of inverter 56 is also fed to a stator voltage proportional adder 57 and from thence to the input terminal of an operation amplifier 58 which serves as a speed threshold circuit. The output signal from operational amplifier 58 is fed to a logic circuit LC, and the output signal from logic circuit LC is fed to summing point SP as a speed signal. Summing point SP also receives the torque signal hereinbefore referred to from multiplier circuit MT and the reference signal from induction master control 33 to provide an error signal for effecting operation of the firing pulse generator circuits FPG1 and FPG2. By this means only torque control is operative during plugging, thereby preventing a condition of high torque being commanded by the speed control circuit SCS. The logic switching circuit LC includes a switch 73 which sets to "off" every time the induction master control contacts RRS in circuit LC go to an "off" position in response to relay RRS. Switch 73 is reset "on" by a rising speed control signal from the threshold circuit 58.

The following is a description of the operation of the speed control section SCS shown in FIG. 1. Note that speed control only applies to a wound rotor motor having an external rotor resistors such as R1, R2, and R3 and slip rings such as SL to obtain rotor voltage, whereas the torque control can be applied to any induction motor.

The basic principle relied on in the speed control section SCS is that, if the flux appearing across the air gap of an induction motor such as 15 is known, then the voltage generator in the rotor 20 is proportional to the difference in angular velocity of the rotational flux in stator 18 and the rotor conductors. Rotor voltage of motor 15 is a maximum with the rotor 20 stopped (stalled) and zero if the rotor 20 is rotating with the same angular velocity as the flux in stator 18. This is the inverse of the signal situation required to control a "closed loop" system. Therefore, after transformation to a lower voltage level and three-phase rectification through rectifier unit 55, the voltage derived from rotor 20 is applied to amplitude inverter 56 which is a biased differential amplifier, i.e., with rotor 20 stalled and maximum voltage appearing thereat, the output from the three-phase rectifier unit 55 is balanced out by a bias voltage. As the rotor voltage decreases when the rotor 20 picks up speed, the input to the differential amplifier 56 becomes unbalanced and, therefore, puts out a voltage proportional to the difference.

This inverted signal from amplifier 56 is now passed through a time-controlled switch 70 in proportional adder 57, which switch has a fixed sampling time period and also has a fixed time relationship to the impressed voltage on the stator winding 18 of the motor 15. The reason for this is that the rotor voltage is proportional to the difference in angular velocity of the stator flux and rotor conductors and, as the flux is varying due to the control of the SCR bank 22 to control the motor, the air gap flux is also varying. Therefore, to obtain a rotor-derived signal of speed, a period of time is chosen during which a known flux condition exists, and by taking a fixed period of time and integrating the rotor-derived voltage over this period, a signal which is proportional to the first approximation is obtained. This speed proportional signal is now applied to variable threshold circuit 58.

Circuit 58 is another differential amplifier but is provided with a bias or threshold signal level which is derived from the operator's induction master control 33. This means that, the more the operator advances the control 33, the higher the threshold level is set and, therefore, the higher the speed derived signal has to rise before it can pass through the amplifier circuit 58 and thereby control the SCR bank 22 via the rest of the circuitry.

Finally, the logic circuit LC switches the speed derived signal "on" by means of switch 73 and allows it to be fed into summing point "SP", but only after the motor speed rises above the threshold level set by the operator's control 33 and the logic circuit LC has been set by the RRS reed switch contacts. This means that, when the operator moves the control 33 handle through the "off" position, the speed signal is blocked at switch 73 and, therefore, the drive system reverts back to a "torque" control for plugging (braking). Then, when motor speed again exceeds speed in the opposite direction, the logic flip flop 74 in the logic circuit LC again is triggered and thereby releases the speed derived signal to the summing point SP and thereby enables control of the SCR bank 22 via the regulator amplifier RA and firing pulse generator's FPG1 and FPG2.

In the control system hereinbefore described, there is regulation of both torque and speed of motor 15 to provide smoother acceleration, more tightly regulated speed, better inching speed, and prevention of jerking and swinging of the crane load. In the control system, both torque and speed are automatically regulated, and both torque and speed are proportional to the throw of the operating handle of the induction master control 33.

The theory and formulation on which the present invention is based may be understood from the following analysis.

(1) $P_G = P_M + P_R$
(2) $P_M = (1-s')P_G$ also
(3) $P_M = (1-s')\omega_s T$
  setting (2) = (3)
(4) $(1-s')P_G = 0 (1-s')\omega_s T$
  solving for T,
$$T = \frac{(1-s')P_G}{(1-s')\omega_s} = \frac{P_G}{\omega_s}$$

(where $\omega_s$ = synchronous angular velocity
$s'$ = slip per unit
$T$ = torque)

Note that torque is not a function of speed but only a function of $P_G$. Thus, if $P_G$ is kept constant, T will be constant for all speeds.

We claim:

1. Means for ascertaining the instantaneous rotor speed of an alternating current induction motor having a wound rotor and a stator and energizable from a source of alternating current electric power through a controlled rectifier bank connected to said stator comprising:
    first means, including a time-controlled sampling module switch, for detecting the instantaneous voltage in said wound rotor at a predetermined point in time and providing an alternating current signal related thereto;
    second means for reducing, rectifying and inverting said alternating current signal and for providing a signal related thereto; and
    third means for receiving and converting said signal into an analog voltage signal proportional to instantaneous speed.

2. A control system according to claim 1 wherein said means for providing said speed signal includes means to provide said speed signal only when said motor is operating above a predetermined speed.

3. In a control system for regulating the speed of an induction motor throughout its entire speed range, said motor having a wound rotor and a stator and energizable from an alternating current source through a controlled rectifier bank connected to said stator, in combination:
    an operator's control movable to selected positions to effect motor operation and for providing a reference signal related to a selected position;
    means, including a time-controlled sampling module switch, for sensing the instantaneous magnitude of the voltage in said wound rotor at a predetermined point in time and for providing a speed signal related to instantaneous motor speed;
    means for providing a feedback signal related to said speed signal; and
    means for comparing said feedback signal and said reference signal and for providing an error signal for regulating said controlled rectifier bank to thereby regulate speed for a selected position of said operator's control.

4. A control system according to claim 3 wherein the means for sensing the instantaneous rotor speed comprises:
    first means for detecting the instantaneous voltage in said wound rotor and providing an alternating current signal related thereto;
    second means for reducing, rectifying and inverting said alternating current signal and for providing a square wave signal related thereto; and
    third means for receiving and converting said square wave signal into an analog voltage signal proportional to speed.

5. A control system according to claim 4 wherein said means for providing said speed signal includes means to provide said speed signal only when said motor is operating above a predetermined speed.

6. In combination:
    an alternating current induction motor having a wound rotor and a stator and energizable from an alternating current source through a controlled rectifier bank connected to said stator and a control system for regulating the speed of said motor throughout the entire speed range thereof,
    said control system comprising:
    an operator's control having an operating member movable between a neutral position and any one of a plurality of operating positions, said control providing a reference signal related to handle movement and position;
    means for providing a speed signal related to instantaneous motor speed, said means for providing said speed signal comprising means, including a time-controlled sampling module switch, for deriving a signal related to the magnitude of the instantaneous voltage in said wound rotor at a predetermined point in time;
    means for providing a feedback signal related to said speed signal; and
    means for comparing said feedback signal and said reference signal and for providing an error signal for operating said controlled rectifier bank to control motor speed.

7. A control system according to claim 6 wherein the means for sensing the instantaneous rotor speed comprises:
- first means for detecting the instantaneous voltage in said wound rotor and providing an alternating current signal related thereto;
- second means for reducing, rectifying and inverting said alternating current signal and for providing a square wave signal related thereto; and
- third means for receiving and converting said square wave signal into an analog voltage signal proportional to speed.

8. A control system according to claim 7 wherein said means for providing said speed signal includes means to provide said speed signal only when said motor is operating above a predetermined speed.

9. A control system for regulating the speed and torque of a reversible alternating current motor throughout their entire range, said motor having stator windings energizable from an alternating current source through a controlled rectifier bank, comprising:
- an operator's control having a member selectively movable in opposite direction from a neutral position to effect forward and reverse operation of said motor, said control providing a reference signal related to member position;
- means for providing a speed signal related to instantaneous motor speed, said means for providing said speed signal comprising means, including a time-controlled sampling module switch, for deriving a signal related to the magnitude of the instantaneous voltage in said wound rotor at a predetermined point in time;
- means for providing a feedback signal related to said speed signal;
- means including a summing circuit for comparing said feedback signal and said reference signal and for providing an error signal;
- means including a regulator circuit for processing said error signal and providing a control signal output proportional to said error signal; and
- firing pulse generator means for receiving said control signal and for providing firing pulses for operating said controlled rectifier bank to control motor speed.

10. A control system according to claim 9 wherein the means for sensing the instantaneous rotor speed comprises:
- first means for detecting the instantaneous voltage in said wound rotor and providing an alternating current signal related thereto;
- second means for reducing, rectifying and inverting said alternating current signal and for providing a square wave signal related thereto; and
- third means for receiving and converting said square wave signal into an analog voltage signal proportional to speed.

11. A control system according to claim 10 wherein said means for providing said speed signal includes means to provide said speed signal only when said motor is operating above a predetermined speed.

12. Means according to claim 1 wherein said second means provides a square wave signal.

* * * * *